(12) United States Patent
Kyusojin

(10) Patent No.: US 7,483,960 B2
(45) Date of Patent: Jan. 27, 2009

(54) SYSTEM AND METHOD FOR PROVIDING A SERVICE TO A TERMINAL HAVING DATA FORMAT SPECIFICATIONS

(75) Inventor: Hiroshi Kyusojin, Kanagawa (JP)

(73) Assignee: Sony Corporation, Tokyo (JP)

( * ) Notice: Subject to any disclaimer, the term of this patent is extended or adjusted under 35 U.S.C. 154(b) by 713 days.

(21) Appl. No.: 10/242,538

(22) Filed: Sep. 12, 2002

(65) Prior Publication Data

US 2003/0065716 A1 Apr. 3, 2003

(30) Foreign Application Priority Data

Sep. 12, 2001 (JP) ............................ P2001-277042

(51) Int. Cl.
*G06F 15/16* (2006.01)
(52) U.S. Cl. ...................... 709/219; 709/227; 709/231; 709/232; 709/246
(58) Field of Classification Search ......... 709/226–238, 709/246–7, 217–219; 715/500.1, 540; 725/105
See application file for complete search history.

(56) References Cited

U.S. PATENT DOCUMENTS

| | | | | |
|---|---|---|---|---|
| 5,283,887 A * | 2/1994 | Zachery | ...................... | 715/513 |
| 5,495,552 A * | 2/1996 | Sugiyama et al. | ........... | 704/201 |
| 5,497,434 A * | 3/1996 | Wilson | ........................ | 382/232 |
| 5,692,157 A * | 11/1997 | Williams | ..................... | 709/246 |
| 5,832,298 A * | 11/1998 | Sanchez et al. | ................ | 710/8 |
| 6,014,712 A * | 1/2000 | Islam et al. | .................. | 709/246 |
| 6,023,714 A * | 2/2000 | Hill et al. | ..................... | 715/513 |
| 6,055,522 A * | 4/2000 | Krishna et al. | .............. | 715/205 |
| 6,128,668 A * | 10/2000 | Barber et al. | ................ | 709/246 |
| 6,300,947 B1 * | 10/2001 | Kanevsky | ................... | 715/866 |
| 6,373,507 B1 * | 4/2002 | Camara et al. | .............. | 715/825 |
| 6,404,776 B1 * | 6/2002 | Voois et al. | .................. | 370/468 |
| 6,418,147 B1 * | 7/2002 | Wiedeman | ................... | 370/468 |
| 6,501,441 B1 * | 12/2002 | Ludtke et al. | ................ | 345/1.1 |
| 6,502,000 B1 * | 12/2002 | Arnold et al. | ................. | 700/83 |
| 6,519,568 B1 * | 2/2003 | Harvey et al. | .................. | 705/1 |
| 6,529,146 B1 * | 3/2003 | Kowalski et al. | ............. | 341/50 |
| 6,549,942 B1 * | 4/2003 | Janky et al. | ................. | 709/219 |
| 6,614,549 B1 * | 9/2003 | Hlava | ........................ | 358/1.15 |
| 6,665,276 B1 * | 12/2003 | Culbertson et al. | .......... | 370/282 |

(Continued)

FOREIGN PATENT DOCUMENTS

JP 10-283247 10/1998

(Continued)

OTHER PUBLICATIONS

Office Action issued by the Japanese Patent Office on Aug. 28, 2007 for corresponding Japanese Application No. 2001-277042.

*Primary Examiner*—Joseph E Avellino
(74) *Attorney, Agent, or Firm*—Bell, Boyd & Lloyd LLP

(57) ABSTRACT

In a service providing system that provides optimum services for a request from each terminal, a terminal transmits its own device ID, corresponding to IP address, to a server. The server receives the device ID, searches for a specification of the terminal in a specification information table of the server, and then provides a service meeting the specification of the terminal.

21 Claims, 8 Drawing Sheets

U.S. PATENT DOCUMENTS

| | | | |
|---|---|---|---|
| 6,675,210 B1* | 1/2004 | Takeo et al. | 709/224 |
| 6,675,387 B1* | 1/2004 | Boucher et al. | 725/105 |
| 6,684,088 B1* | 1/2004 | Halahmi | 455/566 |
| 6,789,110 B1* | 9/2004 | Short et al. | 709/221 |
| 6,856,414 B1* | 2/2005 | Haneda et al. | 358/1.15 |
| 6,891,795 B1* | 5/2005 | Hamachi et al. | 370/227 |
| 6,925,595 B1* | 8/2005 | Whitledge et al. | 715/513 |
| 6,938,174 B2* | 8/2005 | LeKuch et al. | 713/320 |
| 7,010,758 B2* | 3/2006 | Bate | 715/841 |
| 7,114,174 B1* | 9/2006 | Brooks et al. | 725/105 |
| 7,117,152 B1* | 10/2006 | Mukherji et al. | 704/235 |
| 7,143,432 B1* | 11/2006 | Brooks et al. | 725/105 |
| 7,260,607 B2* | 8/2007 | Aktas et al. | 709/206 |
| 2001/0039540 A1* | 11/2001 | Hofmann et al. | 707/3 |
| 2001/0045964 A1* | 11/2001 | Camara et al. | 345/810 |
| 2002/0013826 A1* | 1/2002 | Hughes et al. | 709/219 |
| 2002/0025813 A1* | 2/2002 | Boehmer et al. | 455/435 |
| 2002/0038351 A1* | 3/2002 | Khan et al. | 709/217 |
| 2002/0073163 A1* | 6/2002 | Churchill et al. | 709/214 |
| 2002/0078253 A1* | 6/2002 | Szondy et al. | 709/315 |
| 2003/0002635 A1* | 1/2003 | Koch et al. | 379/88.17 |
| 2003/0023671 A1* | 1/2003 | Abdulrahiman et al. | 709/203 |
| 2003/0041095 A1* | 2/2003 | Konda et al. | 709/201 |
| 2003/0053135 A1* | 3/2003 | Simpson et al. | 358/2.1 |
| 2003/0093565 A1* | 5/2003 | Berger et al. | 709/246 |
| 2004/0205453 A1* | 10/2004 | Mortensen | 715/500 |
| 2006/0022048 A1* | 2/2006 | Johnson | 235/462.1 |
| 2006/0041685 A1* | 2/2006 | Bracewell et al. | 709/246 |

FOREIGN PATENT DOCUMENTS

| | | |
|---|---|---|
| JP | 10-326244 | 12/1998 |
| JP | 10326244 | 12/1998 |
| JP | 2000-250788 | 9/2000 |
| JP | WO-01/59957 | 2/2001 |
| JP | 2001-134518 | 5/2001 |
| JP | 2001-216230 | 8/2001 |

* cited by examiner

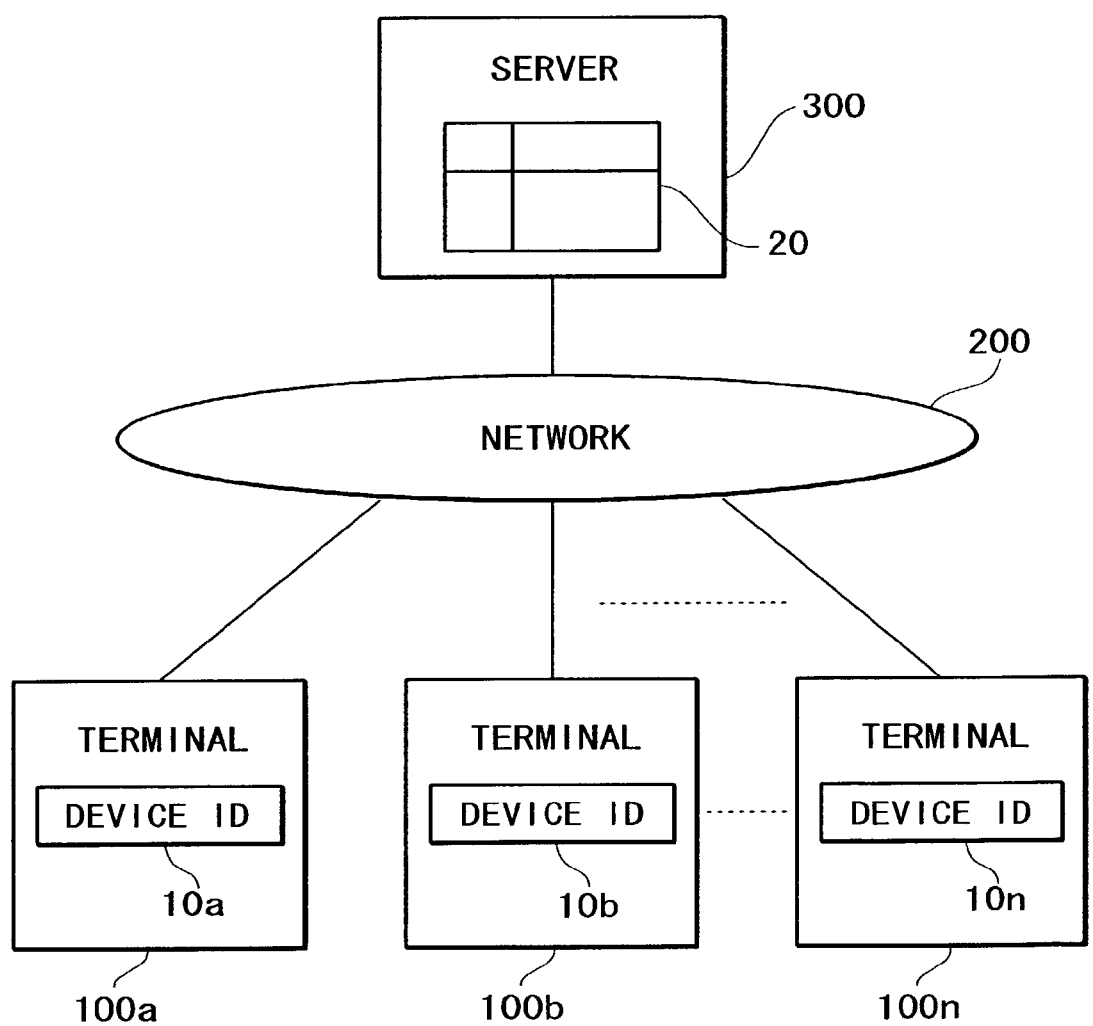
F I G. 1

F I G. 3

| REGISTERED DEVICE ID | AVAILABLE MOVING PICTURE FORMAT | FRAME SIZE | FRAME RATE (fps) | BIT RATE (Mbps) |
|---|---|---|---|---|
| ABCD | VideoCD | 720 × 480<br>352 × 240 | 29.97 | 1.15 |
| | MPEG-1 | 352 × 240 | 29.97 | 0.5~2.0 |
| | MPEG-2 | 720 × 480<br>640 × 480<br>352 × 480 | 29.97 | 1~6 |

SYSTEM AND METHOD FOR PROVIDING A SERVICE TO A TERMINAL HAVING DATA FORMAT SPECIFICATIONS

BACKGROUND OF THE INVENTION

The present invention relates to a service providing system that distributes data to user terminals (hereinafter referred to as a terminal) over the network, and more particularly to a service providing system that can provide a service that is best suited for a request from each terminal, by referring to a device identification code (hereinafter referred to as a device ID) uniquely assigned to each terminal.

With the recent rapid development of the Internet, various problems such as shortage of address space have occurred in the currently used Internet protocol version 4 (IPv4). To solve the problems, Internet Protocol version 6 (IPv6) (i.e., the next generation of the Internet protocol) is under development. The IPv6 is characterized by having an extremely large number of IP addresses. The 128-bit address space of the IPv6, where $3.4 \times 10^{38}$ addresses are available, can solve the problem of the shortage of IP addresses which occurred in IPv4. This also permits each terminal to have its own device ID contained in an IP address.

A prior service providing system that distributes data, as a service, to each terminal will be described as follows. The conventional service providing system manipulates, as a distribution service, such data as a still picture, a moving picture, and audio. Each of these types of data needs to have its own data format available for use in computers. In this service providing system, in response to access requests from terminals, a server reports a list of distributable data formats to each of the terminals. The terminal reports back a data format available for use in itself to the server. This prompts the server to provide the services to the terminal.

However, the use of Personal Digital Assistants (PDAs) as a terminal often limits the number of data formats available for use in the terminal. Thus, the list of data formats provided by the server is often sure to include data formats the terminal cannot manipulate, thereby causing an unnecessary data exchange over the network. In addition, the terminals that can manipulate less data formats tend to have a less powerful Central Processing Unit (CPU). This burdens such terminals with an unnecessary task of selecting a compatible data format from the limited selection.

In addition, message exchanging with a server, together with such information as a data format or a parameter, with the terminal that can manipulate only a single data format, not only complicates the data communication, but also causes a delay to the distribution service. The delay is accelerated in proportion to the distance between the server and the terminal.

JP-A No. 283247/1998 discloses a method of providing a service meeting the request from each terminal. The method includes a step to allocate each terminal its own device ID information for its identification, a step for the terminal to transmit the device ID information to a server, and a step for the server to return a list of files available for downloading by the terminal. However, the method does not cover data accessing that needs to manipulate a number of data formats such as of a moving picture and a still picture. Thus, the data accessing needs to have those data formats adapted for each terminal.

SUMMARY OF THE INVENTION

An object of the invention is, therefore, to provide a service providing system that provides a service meeting a specification of each terminal. Another object of the invention is to provide a service providing method that provides a service meeting a specification of each terminal.

One embodiment of the present invention is directed to a service providing system that provides a service to a terminal. The system includes terminals, each of which has a unique device ID, that transmit their unique device ID when accessing the system. The system further includes a server with a specification information table storing specifications of the terminals, each of the specifications corresponds to a device ID. The server receives the device ID from the terminal, and then provides a service meeting the specification of the each terminal.

The physical nature of the system allows the server to provide a service meeting the specification of each terminal, and also to prevent unnecessary data flow over the network. The composition of the system also benefits terminals with quick data distribution service from the server.

Another embodiment of the present invention is directed to a service providing method that provides a service to each terminal, the method includes a step for a server to receive a device ID from a terminal, a step for the server to recognize the terminal from the device ID, a step for the server to search for specification information of the terminal, and a step for the server to provide a service meeting the specification of the terminal.

The method allows the server to distribute a service meeting the specification of each terminal. This prevents unnecessary data flow over the network, and shortens a period until the server starts to provide the service to each terminal.

Additional features and advantages of the present invention are described in, and will be apparent from, the following Detailed Description of the Invention and the FIGS.

BRIEF DESCRIPTION OF THE DRAWINGS

FIG. 1 is a schematic view showing a structure of a service providing system according to an embodiment of the present invention.

FIG. 3 is an example of a specification information table of a server.

DETAILED DESCRIPTION OF THE INVENTION

FIG. 1 is a diagram showing an embodiment of a service providing system according to the present invention. The service providing system includes a server 300 that provides services available for terminals, and a number of terminals 100*a*, 100*b* to 100*n* that connect to the server 300 via a network 200. The terminals 100*a*, 100*b* to 100*n* have their own unique device IDs 10*a*, 10*b* to 10*n*, respectively.

The terminals 100*a*, 100*b* to 100*n* are, for example, personal computers (PC) or the like. The personal computer in an embodiment includes a central control device such as a CPU; input devices such as a keyboard and a mouse; a display device such as a Cathode Ray Tube (CRT) display; an audio device such as a speaker; an output device such as a printer; storage devices such as a Read Only Memory (ROM), a Random Access Memory (RAM), and a hard disk (HD) that store an operating system (OS), application files, and the device IDs 10*a*, 10*b* to 10*n*; and a communication device such as a modem that connects to the network 200 to transmit the device IDs 10*a*, 10*b* to 10*n* and other signals to the server 300. When the terminals 100*a*, 100*b* to 100*n* connect to the network 200, the device IDs 10*a*, 10*b* to 10*n* of the terminals 100*a*, 100*b* to 100*n* are added to, for example, lower bits of an IP address of IPv6, and then transmitted to the server 300.

In an embodiment, the server 300 includes a specification information table 20 that stores information on specifications of the terminals 100*a*, 100*b* to 100*n* corresponding to the device IDs 10*a*, 10*b* to 10*n*; a storage device that stores an application program that serves for providing optimum distribution services of moving pictures and still pictures, and the like, to the terminals 100*a*, 100*b* to 100*n*; and a central control device that searches each of the specifications of the terminals 100*a*, 100*b* to 100*n* from each of the device IDs 10*a*, 10*b* to 10*n* transmitted from those terminals, by using the specification information table 20. The specifications include decodable still picture formats, decodable moving picture formats, decodable audio formats, decodable picture sizes, and decodable number of colors, on the terminals 100*a*, 100*b* to 100*n*.

Figure 2:
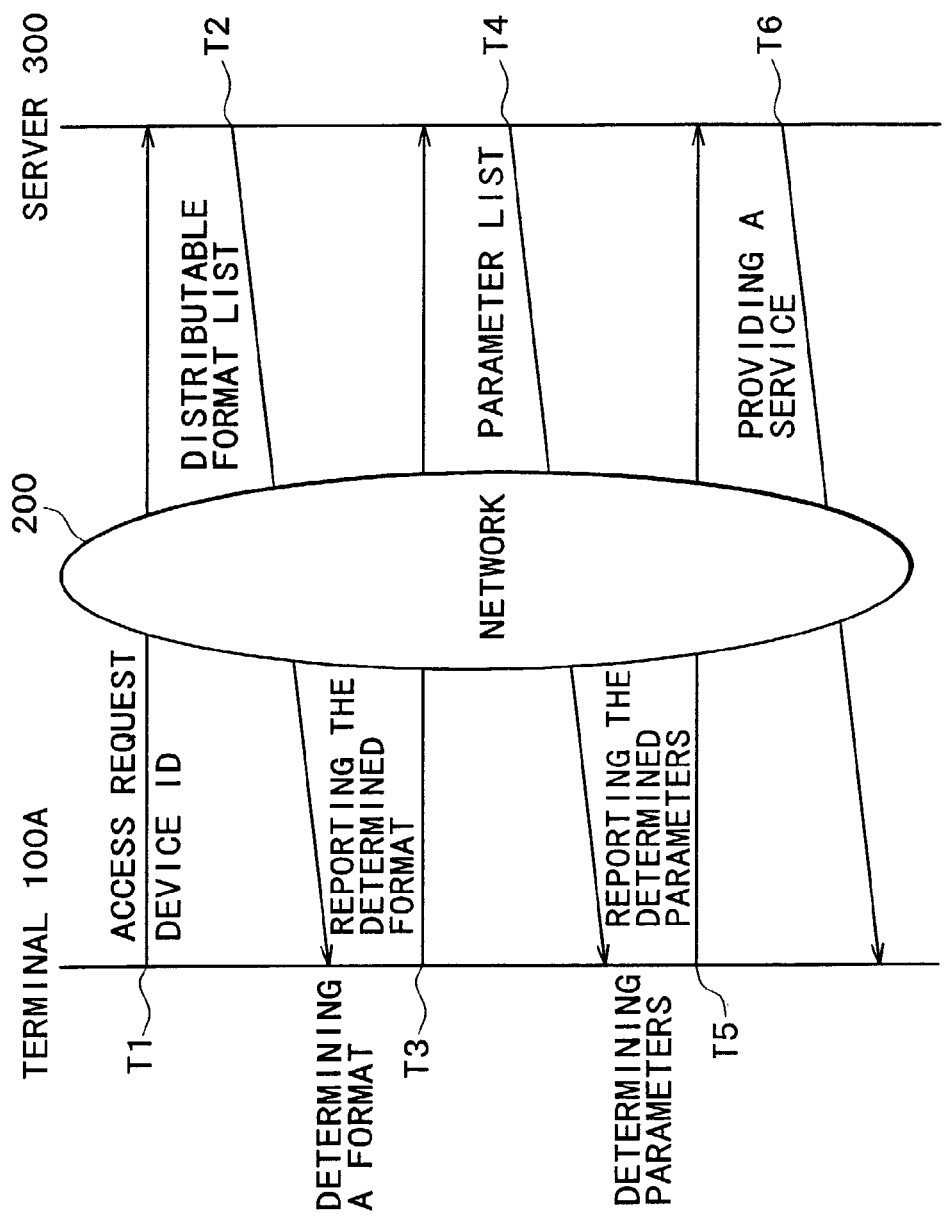
FIG. 2 is a communication sequence diagram showing the service providing system according to an embodiment of the present invention.

A moving picture distributing service will be described below. FIG. 2 is a communication sequence up to the start of the service by the service providing system. Each process of the sequence will be described below. However, it should be appreciated that the terminals 100*a*, 100*b* to 100*n* execute the same processes. Thus, only the process of the terminal 100*a* will be described below.

At T1, the terminal 100*a* makes an access request to the server 300 via the network 200. In parallel with the access request, the terminal 100*a* transmits the device ID 10*a* of the terminal 100*a* to the server 300. At T2, The server 300 transmits a list of distributable moving picture formats to the terminal 100*a*.

The server 300 receives the device ID 10*a* of the terminal 100*a* through the process of T1. Then, the server 300 collates the device ID 10*a* of the terminal 100*a* with registered device IDs stored in the storage device of this server, and thereby identifies the terminal 100*a* which has made the access request. The specification information table 20 that includes specification information on the terminal 100*a*, corresponding to the registered device ID 10*a*, is stored in the storage device of this server.

FIG. 3 shows a specification information table 20 stored in the storage device of the server 300. According to the registered device ID 10*a*, shown as ABCD, of the terminal 100*a*, the specification information table 20 indicates the available moving picture formats and parameters for this terminal 100*a*.

As shown in FIG. 3, this device ID, shown as ABCD, corresponds to the available data format for the terminal 100*a* such as Video CD, MPEG-1, and MPEG-2. When selecting Video CD, the frame sizes are 720×480 and 352×240, the frame rate is 29.97 (fps), and the bit rate is 1.15 (Mbps). When selecting MPEG-1, the frame size is 352×240, the frame rate is 29.97 (fps), and the bit rate is in the range of 0.5 to 2.0 (Mbps). When selecting MPEG-2, the frame sizes are 720× 480, 640×480, and 352×480, the frame rate is 29.97 (fps), and the bit rate is in the range of 1 to 6 (Mbps).

The server 300 selects only the data formats available for the terminal 100*a* that makes an access request, produces a list of the moving picture formats available for the terminal 100*a*, and then reports the list to the terminal 100*a*.

At T3, the terminal 100*a* reports its desired moving picture format to the server 300. Referring to the list of the moving picture formats transmitted from the server 300, the terminal 100*a* determines its desired moving picture format, and reports the determined format to the server300. If the terminal 100*a* would select the MPEG-1 depending on a load and a condition of the network, the terminal 100*a* notifies the server 300 that the MPEG-1 is determined as its desired moving picture format.

At T4, the server 300 produces a list of parameters available for the moving picture format selected by the terminal 100*a*, and reports the list to the terminal 100*a*. At T3, when the moving picture format selected by the terminal 100*a* is reported to the server 300 via the network 200, the server 300 investigates a parameter group available for the selected moving picture format, and transmits the parameter list, after the investigation, to the terminal 100*a*. The terminal 100*a* selects the MPEG-1 format as shown in FIG. 3. FIG. 3 shows that the specification information table 20 indicates available parameters for the terminal 100*a* according to the device ID 10*a*, ABCD as a frame size of 352×240, a frame rate of 29.97 (fps), and a bit rate of 0.5 to 2.0 (Mbps). The frame size and frame rate are fixed, and only the bit rate is capable of being set. Thus, the server 300 selects only the bit rate as the parameter, and reports the bit rate as the parameter list to the terminal 100*a*.

At T5, referring now to the parameter list transmitted from the server 300, the terminal 100*a* determines a parameter, and reports it to the server 300. Where the specification of the terminal 100*a* is as shown in FIG. 3, and the terminal 100*a* selects the MPEG-1 format as the moving picture format at T2, the server 300 transmits only the bit rate as the parameter to the terminal 100*a*, as described at T4. For example, the terminal 100*a* sets the bit rate to 0.5 (Mbps), and reports it to the server 300.

At T6, the server 300 starts to provide a service according to the format and the parameters reported from the terminal 100*a*. In moving picture formats decodable in the terminal 100*a* as shown in FIG. 3, the server makes a distribution service, to the terminal 100*a*, of a moving picture data. That is, the MPEG-1 format with a frame size of 352×240, a frame rate of 29.97 (fps), and a bit rate of 0.5 (Mbps), which has been determined during the processes up to T5.

As described above, data used only for the terminal 100*a* is selected and transmitted, saving time for a process in the terminal 100*a*, namely time required to start a service provision. This also reduces the amount of data flow over the network.

Figure 4:
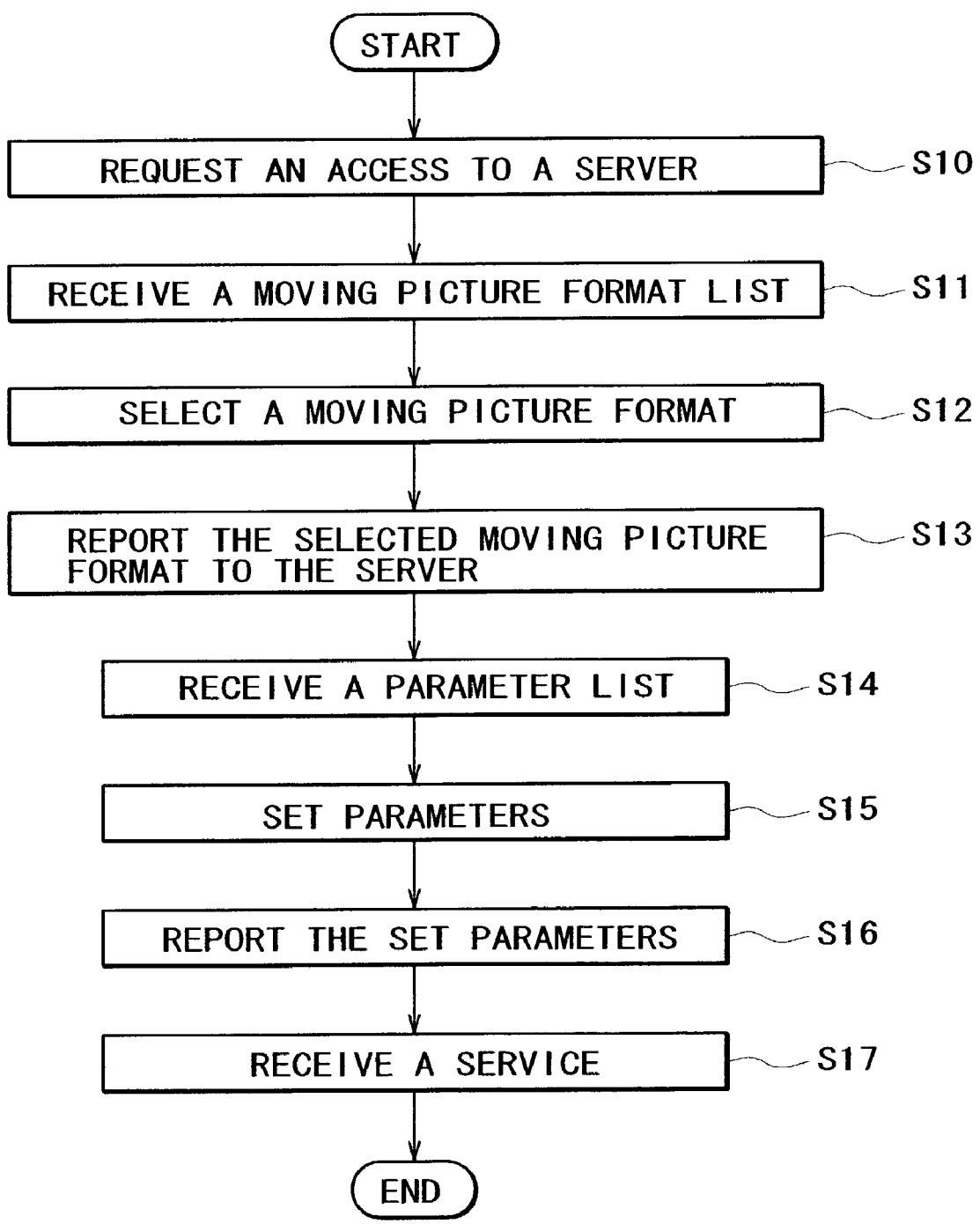
FIG. 4 is a flowchart showing a process executed by each terminal in the communication sequence diagram of FIG. 2.

FIG. 4 is a flowchart showing a process executed by the terminal 100*a*, in the moving picture distributing service described in FIG. 2. Each step of the flowchart will be described as follows. At step S10, the terminal 100*a* makes an access request to the server 300. The central control device of the terminal 100*a* fetches the device ID 10*a*, the number of which is uniquely assigned to the terminal and stored in, for example, a ROM of the terminal 100*a*. In parallel with the access request, the device ID 10*a* contained in lower bits of an IP address of the IP v6 is transmitted to the server 300.

At step S11, the terminal 100*a* receives a list of moving picture formats available for this terminal, which is transmitted by the server 300. Referring to the device ID 10*a* transmitted by the terminal 100*a* in step S10, the server 300 transmits only a list of the moving picture formats available for the terminal 100*a*. The terminal 100*a* receives the available moving picture formats through a communication device (not shown), and stores the list in a storage device such as a RAM.

At step S12, the terminal 100*a* selects a moving picture format. For example, the central control device of the terminal 100*a* fetches the moving picture format list, which is transmitted by the server 300 in step S11 and stored in the storage device, and displays the list, for example, on the CRT display. Then, the terminal 100*a* selects a suitable moving picture format from the moving picture format list thus displayed on the CRT display by using an input device such as a mouse and a keyboard. Where the moving picture formats decodable in the terminal 100*a* are as shown in FIG. 3, and MPEG-1 is selected, depending on the load of the terminal 100*a* and the network condition, the result of the selection is temporarily stored in the storage device of the terminal 100*a* (e.g., a RAM) and then is ready to be transmitted to the server 300.

At step S13, the terminal 100*a* reports the selected moving picture format to the server 300. The central control device of the terminal 100*a* fetches the result of selecting the moving picture format from the storage device, and reports the result to the server 300. At step S14, the terminal 100*a* receives the list of the parameters available for the terminal 100*a* from the server 300. The server 300 transmits, to the terminal 100*a*, only a list of the moving picture format parameters available for the terminal 100*a* according to the moving picture format transmitted by the terminal 100*a* in step S13. The terminal 100*a* receives the list and stores it in the storage device, for example, a RAM. Where the specification of the terminal 100*a* is as shown in FIG. 3, and MPEG-1 is selected as the moving picture format in step S12, an available parameter is determined with the frame size fixed at 352×240 and the frame rate fixed at 29.97 (fps). This allows the server 300 to transmit only the bit rate of 0.5 to 2.0 (Mbps) as a parameter to the terminal 10*a*. The terminal 100*a* receives the parameter through the communication device.

At step S15, the parameter is set. The central control device fetches the parameter list stored in its storage device (e.g., a RAM) in step S14 and displays it, for example, on the CRT display. Then the device determines an arbitrary parameter from the parameter list by using the input device such as the keyboard and the mouse. The determined parameter is temporarily stored in the storage device (e.g., a RAM) of the terminal 100*a*. Where the specification of the terminal 100*a* is as shown in FIG. 3, and MPEG-1 is selected as the moving picture format, the bit rate is set in the range of 0.5 to 2.0 (Mbps).

At step S16, the terminal 100*a* reports the set parameter to the server 300. The central control device of the terminal 100*a* fetches the parameter stored in the storage device such as a RAM, in step S15 and reports it to the server 300. At step S17, the terminal 100*a* receives a service from the server 300. The terminal 100*a* receives a service meeting the requested moving picture format and parameter, from the server 300. Where the specification of the terminal 100*a* is as shown in FIG. 3, and the bit rate is set to 0.5 (Mbps) in step S15, the moving picture format and parameters have already been determined by the processes up to step S16. Thus, the server 300 makes a distribution service of a moving picture meeting the requested format and parameters of the terminal 100*a*. The terminal 100*a* receives the service through the communication device and stores the moving picture in the storage device such as a HD. Then, the terminal 100*a* can decode the moving picture that is provided from the server 300 and stored in the storage device, on the display device such as the CRT display or on the audio device such as the speaker.

As described above, the terminal 100*a* reports its device ID 10*a* to the server 300, so that the server 300 recognizes moving picture formats available for the terminal 100*a*. Accordingly, the server 300 can avoid unnecessary data exchange over the network because only the formats and parameters available for the terminal 100*a* are exchanged between the server and the client.

Figure 5:
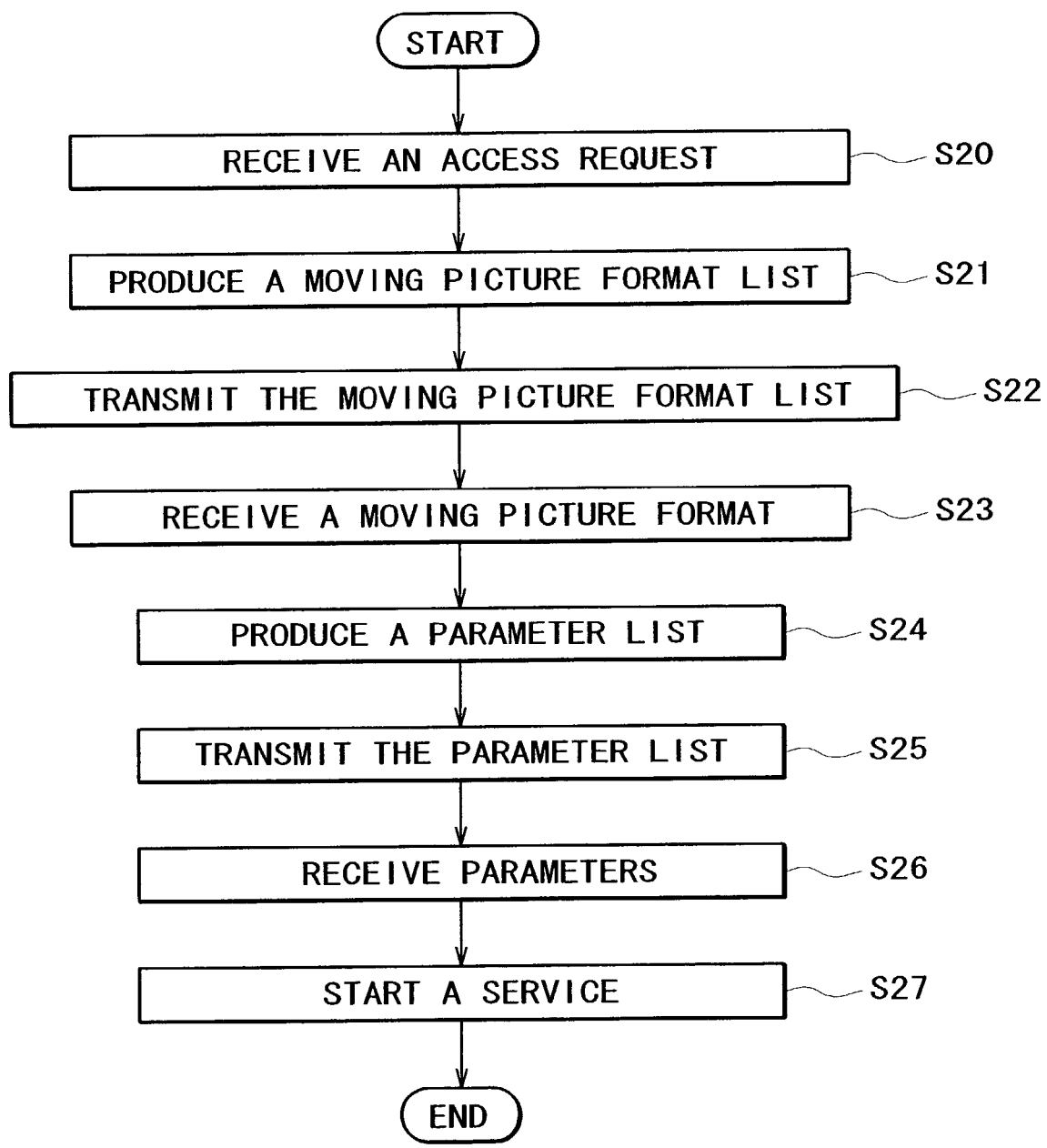
FIG. 5 is a flowchart showing a process executed by the server in the communication sequence diagram of FIG. 2.

FIG. 5 is a flowchart showing a process executed by the server 300 in the moving picture distributing service described in FIG. 2. At step S20, the server 300 receives the access request from the terminal 100*a*. The server 300 simultaneously receives the access request and the device ID, from the terminal 100*a* via the network 200. The server 300 receives the request and the ID through the communication device, and stores them in the storage device, for example, a RAM.

At step S21, the server 300 produces a list of moving picture formats available for the terminal 100*a*. The server 300 collates the device ID 10*a* transmitted from the terminal 100*a* that makes an access request, with the specification information table 20 stored in its storage device, so that the server identifies the terminal 100*a* that makes an access request, and recognizes the specification of the terminal 100*a*. Then, the central control device such as a CPU fetches an application program stored in the storage device, such as a HD. Then, a list of the moving picture formats available for the terminal 100*a* is produced from the moving picture formats stored in the storage device of the server 300. In the specification of the terminal 100*a* as shown in FIG. 3, the central control device produces a list of three types of formats, Video CD, MPEG-1, and MPEG-2 except such moving picture format as Digital Video (DV) which is not available for the terminal 100*a* in this embodiment, and stores this list in the storage device of the server 300 so as to prepare for transmitting the list to the terminal 100*a*.

At step S22, the server 300 transmits the format list to the terminal 100*a*. The sever 300 fetches the moving picture format list available for the terminal 100*a*, which has been produced in step S21, from its storage device, and transmits it to the terminal 100*a* via the network 200. At step S23, the server 300 receives the moving picture format selected by the terminal 100*a*. The terminal 100*a* selects the available moving picture format according to the moving picture list transmitted by the server 300 in step S22, and reports it to the server 300. The central control device of the server 300 receives the moving picture format determined by the terminal 100*a* via its communication device, and stores it in the storage device of the server 300, such as a RAM.

At step S24, the server 300 produces a parameter list. According to the moving picture format determined by the terminal 100*a*, which the server 300 has received in step S23, the server 300 produces a parameter list available for the terminal 100*a* where the specification of the terminal 100*a* is as shown in FIG. 3, and the moving picture format determined by the terminal 100*a* is MPEG-1, a the only available parameter for the terminal 100*a* is the bit rate. This indicates that the parameter is capable of being set in a range of 0.5 to 2.0 (Mbps). The server 300 allows an application program stored, for example, in the HD to produce only a list of the bit rate as the parameter. The produced list is temporarily stored in the storage device of the server 300 (e.g., a RAM) to prepare for transmission of the list to the terminal 100a.

At step S25, the server 300 transmits the parameter list to the terminal 100a. The server 300 allows the central control device to fetch the parameter list produced in step S24, and then transmit it to the terminal 100a. At step S26, the server 300 receives the parameter selected by the terminal 100a. The server 300 receives the parameter determined by the terminal 100a according to the parameter list transmitted in step S25, and stores the list on the storage device (e.g., a RAM) of the server 300.

At step S27, the server 300 starts to provide a service. The available moving picture format and parameter requested by the terminal 100a, have been determined through the steps up to S26, prompting the server 300 to provide a service. Where the terminal 100a selects a bit rate of 0.5 (Mbps) as the parameter, and transmits the parameter to the server 300, the moving picture format of MPEG-1 provided from the server 300 includes the frame size of 352×240, the frame rate of 29.97 (fps), and the bit rate of 0.5 (Mbps).

As described above, the server 300 can easily recognize a moving picture format available for the terminal 100a by referring to device ID of the terminal 100a, which is transmitted by the terminal 100a, to thereby provide a quick service. Additionally, only the format and the parameters available for the terminal 100a are exchanged between the terminal 100a and the server 300, thereby eliminating unnecessary data exchange over the network.

In one embodiment, the terminal 100a is a home information appliance such as a digital television (TV for NTSC, National Television System Committee) with a network interface. In this embodiment, an available format for the digital TV is only DV. Thus, the parameters are fixed with the frame size of 720×480, the frame rate of 29.97 (fps), and the bit rate of 28.8 (Mbps).

Figure 6:
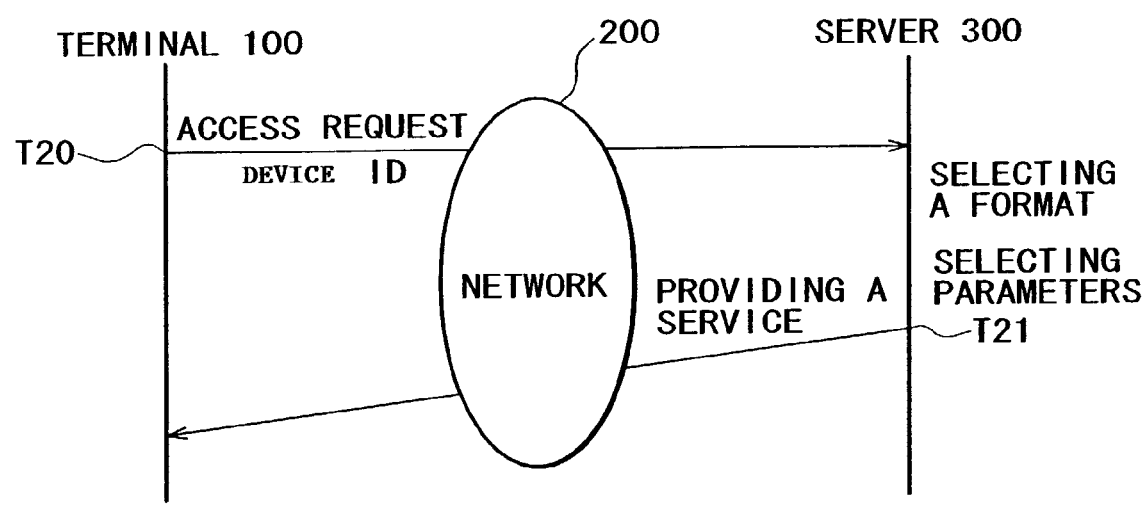
FIG. 6 is a communication sequence diagram of the service providing system when a moving picture format and parameters available for the terminal are fixed.

FIG. 6 is a communication sequence diagram of a service providing system where each of the available format and parameters are fixed at one. Each process shown in the diagram will be explained with reference only to terminal 100a below. At T20, the terminal 100a makes an access request to the sever 300. The device ID 10a of the terminal 100a is transmitted to the server 300 via the network 200.

At T21, the server 300 provides an available service for the terminal 100a. Receiving the access request from the terminal 100a, the server 300 refers to the device ID 10a, transmitted from the terminal 100a simultaneously with the access request, to select moving picture formats and parameters both decodable in the terminal 100a. For example, the server 300 collates or compares the device ID 10a of the terminal 100a with the specification information table 20 of the terminal 100a, which is stored in the storage device of the server 300, to identify the terminal 100a that makes an access request. Then, the server 300 recognizes that the specification of the terminal 100a includes DV as the moving picture format, and a frame size of 720×480, a frame rate of 29.97 (fps), and a bit rate of 28.8 (Mbps) as the parameters. In this case, since each of the moving picture format and parameters available for the terminal 100a are fixed to be one, the server 300 immediately makes a distribution service of a moving picture meeting this format and parameters, to the terminal 100a.

The format and the parameters thus fixed at one eliminate the operations T2 to T5 of the communication sequence diagram of FIG. 2. This prompts the server to provide the service. This realizes not only the simplification of the processes, but also a quick start of the service especially when network delay (Round Trip Time, RTT) caused by the message exchanges between the server 300 and the terminal 100a is large. Further, most home information appliances involve an expensive cost for installing software that determines formats and parameters into the home information appliances. Having the available format and parameters fixed at one allows the home information appliances to easily respond to the server 300.

Figure 7:
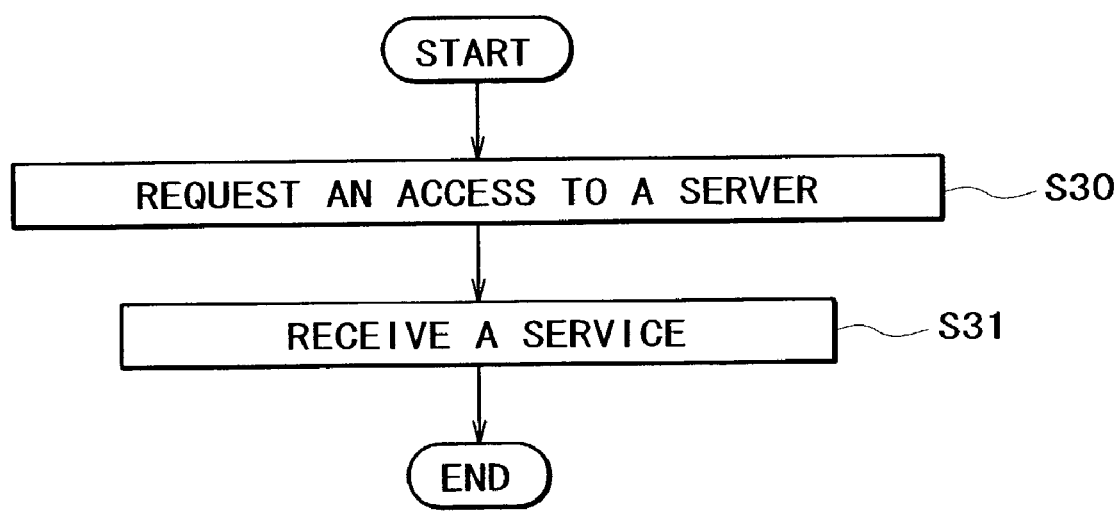
FIG. 7 is a flowchart showing a process executed by the terminal in the communication sequence diagram of FIG. 2.

FIG. 7 is a flowchart showing a process of the terminal 100a in the service providing system where each of the format and parameters available for the terminal 100a is fixed to be one. Each step of the flowchart will be described with reference to terminal 100a as follows. At step S30, the terminal 100a makes an access request to the server 300. In parallel with the access request, the central control device fetches the device ID stored in, for example, a ROM of the terminal 100a, contained, for example, in lower bits of an IP address of IPv6, and transmits it to the server 300.

At step S31, the terminal 100a receives the service. The terminal 100a receives an available moving picture data for itself, as the distribution service of the server 300. The received moving picture is stored in the storage device, for example, a HD. Then, the terminal 100a can decode the moving picture stored in the storage device on the display device such as the CRT device, or on the audio device such as the speaker. As described above, the terminal 100a transmits its own device ID 10a to the server 300. This permits the terminal 100a to smoothly receive a service with no complicated operations such as selecting its available moving picture format, and setting the parameters.

Figure 8:
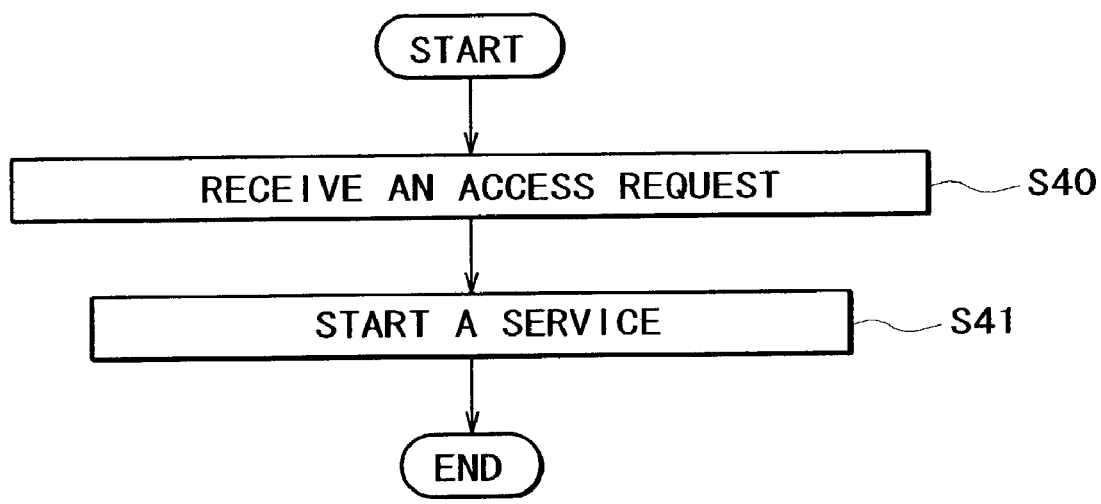
FIG. 8 is a flowchart showing a process executed by the server in the communication sequence diagram of FIG. 6.

FIG. 8 is a flowchart showing a process executed in the server 300 in the service providing system, where each of the available format and parameters for the terminal 100a is fixed to be one. Each step of the flowchart will be described with reference to terminal 100a as follows. At step S40, the server 300 receives an access request from the terminal 100a. The server 300 simultaneously receives the access request and the device ID 10a of the terminal 100a from the terminal 100a via the network 200. The server 300 receives the access request and the device ID through the communication device, and stores them temporarily in the storage device (e.g., a RAM).

At step S41, the server 300 starts to provide a service. The server 300 collates or compares the device ID 10a of the terminal 100a, which is received in step S40, with the specification information table 20 stored in the storage device of the server 300, to identify the terminal 100a that makes an access request. Then, since the application program of the server 300 recognizes that each of the moving picture format and parameters of the specification of the thus identified terminal 100a is fixed to be one, the server 300 fetches a moving picture, meeting the moving picture format and parameters, from the storage device, and starts a distribution service of the moving picture through the communication device. For example, when the terminal 100a is an information home appliance such as the above-described digital TV having the NTSC, the communication device of the server 300 provides a moving picture of DV format in which the frame size is 720×480, the frame rate is 29.97 (fps), and bit rate is 28.8 (Mbps), to the terminal 100a via the network 200.

As described above, the server 300 easily identifies the terminal 100a and recognizes the specification of the terminal 100a, by referring to the device ID 10a transmitted by the terminal 100a, thereby enabling a quick service provision.

Although an embodiment where each of the format and parameters is fixed to be one has been described above, it should be appreciated that in embodiments such as that shown in FIG. 2, where there are a number of selectable formats and parameters, the server 300 can still easily determine and provide an optimum service. This advantageously simplifies and speeds up the process of providing service similar to the embodiment shown in FIG. 6.

Although, in the above description, the server 300 transmits the available format list and the parameters for use in the terminal 100a separately to the terminal 100a, the server 300 in an embodiment may transmit the format and parameters simultaneously to the terminal 100a. Similarly, the terminal 100a may determine and transmit the format and parameters simultaneously to the server 300.

It should be appreciated that the amount of messages about formats and parameters of moving pictures exchanged between the terminal 100a and the server 300 is reduced for optimizing the period and exchanged data amount for the service provision. This optimization of the invention is applicable not only to moving pictures, but also to still pictures and audios.

Further, the optimization of the invention can be applicable for adjusting sizes of a moving picture and a still picture transmitted according to a display screen size of the terminal 100a, determining whether the picture is monochromatic or colored, and adjusting the number of the decodable colors when color picture is determined.

As described above, the service providing system of the invention can provide a service optimum for each terminal by using a device ID the number of which is uniquely assigned to the terminal. The service providing system can also reduce the data amount exchanged between a server and the terminals, and thereby shorten a period required for starting the service.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A service providing system, comprising:
a plurality of terminals, each of the plurality of terminals having a unique device ID, wherein each of the plurality of terminals transmits the respective device ID when accessing the system; and
a server including:
a specification information table storing data format specifications representative of each of the plurality of terminals;
at least one data parameter corresponding to the data format specifications stored in the specification information table; wherein each of the data format specifications corresponding to one of the device IDs representative of one of the plurality of terminals;
wherein the server is programmed to:
  (a) receive the at least one terminal device ID;
  (b) determine whether the specification information table includes more than one data format specification representative of the at least one terminal device;
  (c) in response to the specification information table including more than one data format specification, transmit to each terminal the options for data format specifications;
  (d) upon the receipt of a data format specification choice, determine whether the data format specification corresponds to more than one data parameters;
  (e) in response to the corresponding to more than one data parameter, transmit to each terminal the options for the data parameters and a plurality of data transfer rates; and
  (d) upon the receipt of one of the plurality of data transfer rates and the data parameter selection from each of the terminals, provide each of the terminals with services of the corresponding data format specification and the data parameter selected;
  (e) in response to the specification table including one data format specification and one data parameter, provide service automatically based on the data format specification associated with the terminal.

2. A service providing system according to claim 1, wherein the specification includes a still picture format decodable in each of the terminals.

3. A service providing system according to claim 1, wherein the specification includes a moving picture format decodable in each of the terminals.

4. A service providing system according to claim 1, wherein the specification includes an audio format decodable in each of the terminals.

5. A service providing system according to claim 1, wherein the specification includes a screen size decodable in each of the terminals.

6. A service providing system according to claim 1, wherein the specification includes a plurality of colors decodable in each of the terminals.

7. A service providing system according to claim 1, wherein the device ID is contained in an IP address.

8. A service providing system according to claim 1, including a storage device including a memory storing a motion picture in a plurality of data formats, a plurality of frame rates and a plurality of frame sizes.

9. A terminal configured to access a server via a network, comprising:
a device ID uniquely assigned to the terminal;
a central processing unit programmed to:
  (a) transmit: (i) the device ID; (ii) a data format selection; and (iii) a parameter selection to the server; and
  (b) in response to a specification table including more than one data format corresponding to the terminal, receive from the server options for data format specifications, wherein a plurality of data transfer rates are associated with a data format specification and the data transfer rates being selectable as options, and data parameters related to the transmitted device ID, and upon a selection of a data format specification receiving the data transfer rates and data parameters, and upon a selection of a data transfer rate and a data parameter, receiving the requested service of the corresponding data format specifications and data parameter selected; and
  (c) in response to the specification table including one data format corresponding to the terminal, automatically receive the service,
wherein the specification information table is provided on the server, the specification information table configured to store the data format specifications representative of the terminal and data parameters available for each of the stored data format specifications, wherein the data format specifications correspond to the device ID uniquely assigned to the terminal.

10. A terminal according to claim 9, wherein the device ID is contained in an IP address.

11. A terminal configured to access a server via a network according to claim 9, wherein a storage device stores motion pictures in a plurality of data formats, a plurality of frame rates and a plurality of frame sizes corresponding to the stored data format specifications.

12. A server for providing a plurality of terminals with a service via a network, comprising:
- a specification information table for storing information representative of the available data format specifications of the terminals and data parameters available to each of the data format specifications, wherein a plurality of data transfer rates are associated with a data format specification, wherein each of the data format specifications corresponds to a unique device ID assigned to a respective one of the terminals;
- a central processing unit programmed to cause:
- a receiver to receive the device ID transmitted from each of the terminals and a data format specification selection;
- a searching unit to locate the data format specifications and the available data parameters corresponding to each of the received device IDs of each of the terminals;
- determine whether the specification information table includes more than one data format specification assigned to the respective one of the terminals;
- in response to the specification information table including more than one data format specification, a transmitter to transmit to each of the plurality of terminals options available for the data format specifications,
- in response to the server receiving the data format specification selection, transmit a plurality of data transfer rates and data parameters corresponding to each of the received device IDs; and
- in response to the selection of the data transfer rate and data parameter, a service providing unit to provide a service to each of the terminals;
- in response to the data specification information table including one data format specification, automatically provide the service based on the specification information table;
- wherein the service is provided in the data format and having the data parameter corresponding to the option selected by each of the terminal.

13. A server for providing a plurality of terminals with a service via a network according to claim 12, including a storage device including a memory storing a motion picture in a plurality of data formats, a plurality of frame rates and a plurality of frame sizes.

14. A method for providing a first and a second terminal with a service, the method comprising the steps of:

- receiving a unique device ID from the first and second terminals;
- recognizing the first and second terminals based on the received device IDs;
- determining that no options associated with the first terminal are available and providing the service automatically to the first terminal;
- determining that options associated with the second terminal area available;
- providing the second terminal with options for data format specifications wherein a plurality of data transfer rates and a data parameter are associated with a data format specification;
- receiving a data format specification;
- providing the second terminal with options for the plurality of data transfer rates, and the data parameter related to each device ID; and
- upon a selection of an option by the second terminals or automatically, providing the service to the second terminal having a data format specification, a data transfer rate and a data parameter that corresponds to a predetermined data format specification and data parameter selected and stored in a specification information table.

15. A method for providing a service according to claim 14, wherein the specification includes a still picture format decodable in each of the terminals.

16. A method for providing a service according to claim 14, wherein the specification includes a moving picture format decodable in each of the terminals.

17. A method for providing a service according to claim 14, wherein the specification includes an audio format decodable in each of the terminals.

18. A method for providing a service according to claim 14, wherein the specification includes a screen size decodable in each of the terminals.

19. A method for providing a service according to claim 14, wherein the specification includes a plurality of colors decodable in each of the terminals.

20. A method for providing a service according to claim 14, wherein the device ID is contained in an IP address.

21. A method for providing a plurality of terminals with a service according to claim 14, wherein a storage device stores a plurality of motion pictures corresponding to the data format specifications.

* * * * *